June 22, 1954     E. B. CARVELL     2,681,638
ANIMAL EXERCISER

Filed Oct. 24, 1950     2 Sheets-Sheet 1

Inventor
Edward B. Carvell

By Clarence A. O'Brien
and Harvey B. Jacobson
Attorneys

June 22, 1954　　　E. B. CARVELL　　　2,681,638
ANIMAL EXERCISER
Filed Oct. 24, 1950　　　　　　　　　　　　2 Sheets-Sheet 2

Inventor
Edward B. Carvell

By *Clarence A. O'Brien and Harvey B. Jacobson*
Attorneys

Patented June 22, 1954

2,681,638

UNITED STATES PATENT OFFICE 2,681,638

ANIMAL EXERCISER

Edward B. Carvell, Denver, Colo.

Application October 24, 1950, Serial No. 191,895

3 Claims. (Cl. 119—29)

The present invention relates to improvements in animal exercisers and more particularly to the type of exerciser which may be alternatively employed as a cage.

An object of the present invention is to provide a device which is adapted to be rolled by an animal in order that the animal may be exercised.

A further object of the present invention is to provide a hollow rolling device with a tread surface for exercising an animal and wherein the rolling device is provided with an openable closure whereby the device may be employed as a cage when not exercising the animal.

Still another object of the present invention is to provide an animal exerciser which is simple in construction and economical of manufacture.

Various other objects and advantages will become apparent from the detailed description to follow. The best forms in which I have contemplated applying my invention are clearly illustrated in the accompanying drawings, wherein.

Figure 1:
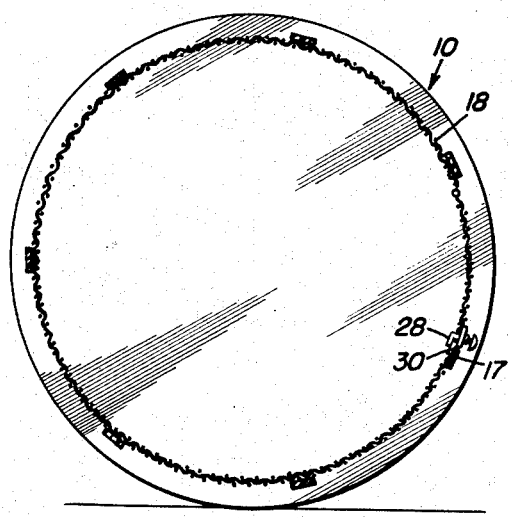
Figure 1 is a vertical transverse sectional view taken substantially along the plane of line 1—1 of Figure 2.

Referring more particularly to the drawings, wherein like numerals designate like parts throughout, the numeral 10 designates generally one form of the animal exerciser while the numeral 12 designates generally a modified form of animal exerciser.

In the first form of animal exerciser 10, a pair of substantially circular disks 14 formed of clear plastic or the like are secured in spaced parallel relation by a plurality of bars 16, conventional means being employed for securing the disks to the ends of the bars 16. A wire mesh means 18 is secured to the inner faces of the bars 16 to provide a cage of cylindrical form and also to provide a tread surface for exercising an animal, the animal being permitted to roll the exerciser on the disks 14. It should be noted that the bars 16 are placed in spaced relation to the periphery of the disks 14 so that the tread material 18 is in spaced relation to the floor or ground upon which the device is adapted to be rolled, as a protection for the animal's feet and for permitting free rolling of the disks.

Figure 2:
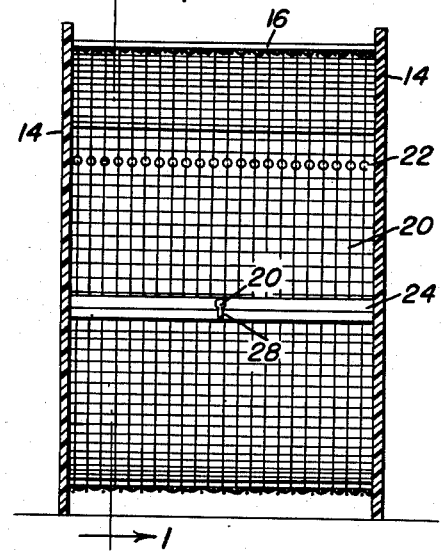
Figure 2 is a vertical sectional view taken on a diameter of the device.

As seen best in Figure 2, a section of the wire mesh means 18, designated by the numeral 20 is hingedly connected to the main portion of the wire mesh means 18 by means of a plurality of rings 22. The opposite free edge of the wire mesh means 20 is secured to a flat bar 24 having a pin 26 rotatably mounted therein. The pin 26 provides a latch by means of the angulated end 28 which is adapted to be positioned behind the latch bar 30 which is in turn secured to the spacer bar 17, as seen in Figure 1.

Figure 4:
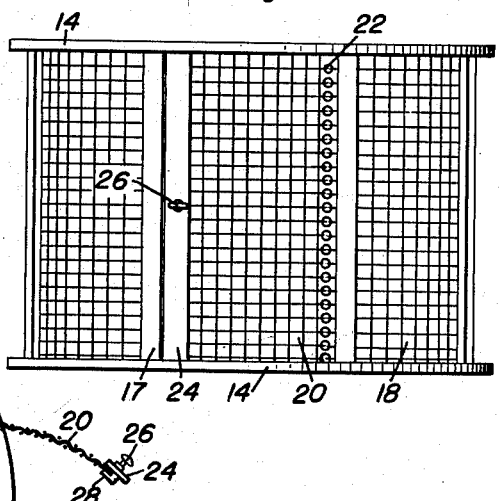
Figure 4 is a side elevational view of the device when employed as a cage.
Figure 3:
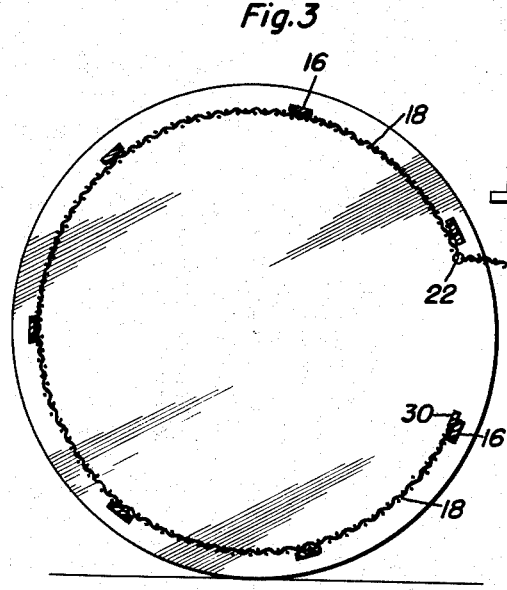
Figure 3 is a vertical transverse sectional view similar to Figure 1 but wherein the openable closure is shown in open position.

When the device is to be used as an animal exerciser, it may be placed on the edges of the disks 14 for rolling in response to the animal's action against the tread means 18. When the device is to be used as a cage, it is placed upon the flat side of one of the disks 14 as in Figure 4 and the openable closure 20 may be pivoted to open position by means of the latch pin 26 as shown in Figure 3. The animal may then be placed within the cage and provided with food and water as desired. The openable closure may then be pivoted to closed position and latched.

Figure 5:
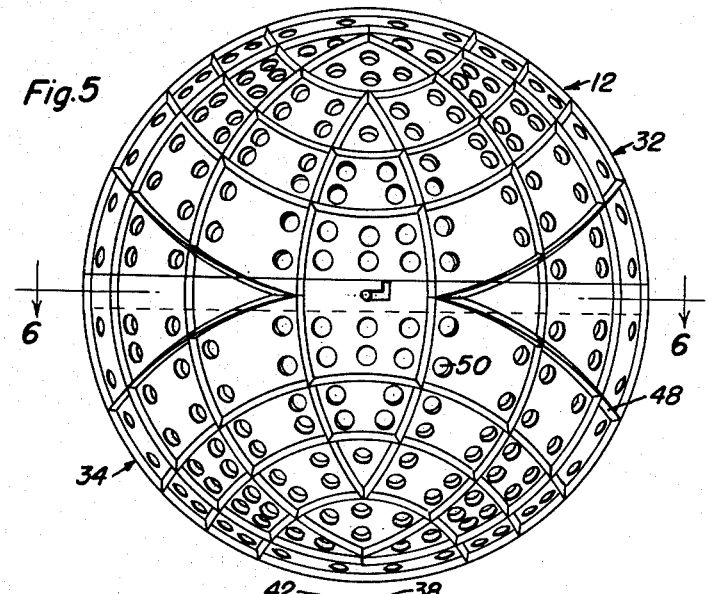
Figure 5 is a side elevational view of a modified form of the invention.
Figure 6:
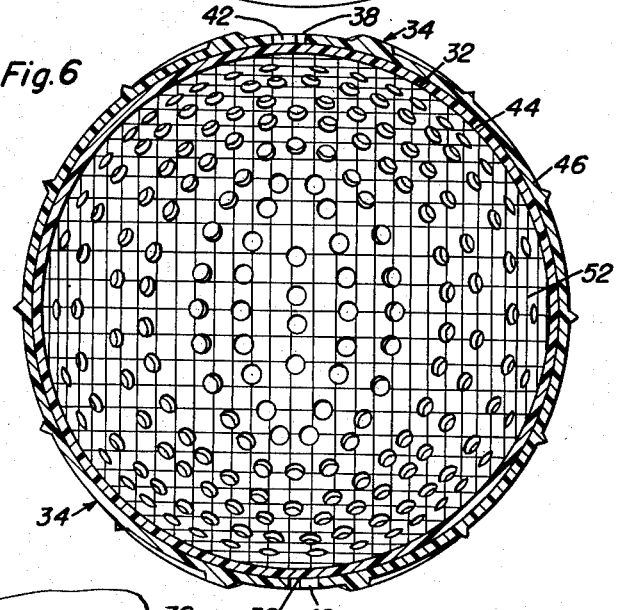
Figure 6 is a horizontal transverse sectional view taken substantially along the plane of line 6—6 of Figure 5.
Figure 7:
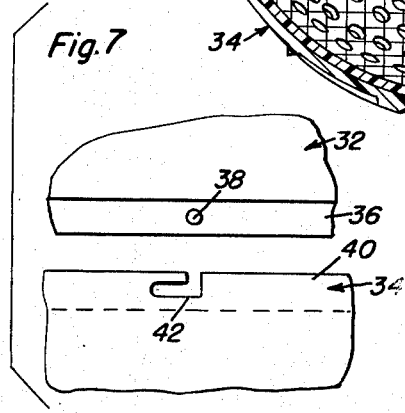
Figure 7 is a detail view of the pin and slot arrangement for securing the sectional portions of the form of the invention disclosed in Figures 5 and 6.

In the form of the animal exerciser shown in Figures 5 through 7, a pair of substantially semi-spherical elements 32 and 34 are provided. The semi-spherical element 32 is provided with a reduced spherical portion adjacent the open side at 36 with a pin 38 projecting outwardly therefrom. The semi-spherical element 34 is provided with a recessed portion at 40 for engagement over the reduced peripheral portion 36 of the other element 32 and has a slot 42 of L-shape for receiving the pin 38 whereby the two elements 32 and 34 may be secured together.

Each of the elements 32 and 34 is formed of an interior shell portion 44 and an exterior shell portion 46 which may be molded together to form integral semi-spherical sections by any conventional means desired. The material from which the animal exerciser 12 may be made is clear plastic so that the device may be used as a cage, and so that the animal may be viewed from the exterior of the cage for display purposes and the like. The exterior shell portion 46 is provided with a plurality of grooves 48 to provide a tread surface when the device is to be used as an animal exerciser with the animal on the exterior of the ball. A plurality of apertures 50 are formed in the sphere to provide communication between the interior of the ball and the atmosphere whereby when an animal is positioned within the ball, the atmosphere will be in free communication with the interior.

In order that the animal exerciser 12 may be employed as an animal exerciser when the animal is in the interior of the sphere, wire mesh means 52 may be secured to the inner surface of the inner portion 44 to provide a tread surface. However, other means may be employed for forming the tread surface such as grooves or a roughened surface.

From the foregoing description, taken in conjuction with the drawings, it is apparent that an animal exerciser has been provided which will accomplish all of the objects hereinabove set forth, and further description thereof at this point is deemed unnecessary.

Having described the invention, what is claimed as new is:

1. An animal exerciser comprising a pair of disks of substantially circular form, a plurality of spacing bars connecting said disks and maintaining the disks in spaced relation, said spacing bars being connected to said disks inwardly of the peripheral edges of said disks, and wire mesh means secured to said bars to enclose a cylindrical cage and provide a tread for exercising an animal, one portion of said wire mesh means being hingedly secured to one of said bars to provide an openable closure for the cage, and a latch means for securing said closure in closed position, said latch means including a keeper on said one bar and a latching element on said hinged portion.

2. An animal exerciser comprising a pair of disks of substantially circular form, a plurality of spacing bars connecting said disks and maintaining the disks in spaced relation, said spacing bars being connected to said disks inwardly of the peripheral edges of said disks, and means secured to said bars to enclose a cylindrical cage and provide a tread for exercising an animal, one portion of said means being hingedly secured to one of said bars to provide an openable closure for the case.

3. An animal exerciser and cage comprising a pair of spaced, parallel disks, a plurality of spacing bars interconnecting said disks, said spacing bars being circumferentially spaced around said disks and being secured to said disks inwardly of the peripheral edges thereof, foraminous screening secured to said spacing bars and extending therearound and spaced inwardly of the peripheral edges of said disk, said screening constituting a cylindrical wall enclosing the spaces between said disks to provide a cage, one section of screening extending between two of said spacing bars constituting a pivotally secured door affording access into the interior of the cage and latch means for retaining said door in closed position.

References Cited in the file of this patent

UNITED STATES PATENTS

| Number | Name | Date |
| --- | --- | --- |
| 277,724 | Hendryx | May 15, 1883 |
| 796,794 | Baur | Aug. 8, 1905 |
| 883,485 | Ridgway | Mar. 31, 1908 |
| 1,212,771 | Holland | Jan. 16, 1917 |
| 1,258,684 | Johnson | Mar. 12, 1918 |
| 1,521,133 | Tinker | Dec. 30, 1924 |
| 1,632,380 | Marcus | June 14, 1927 |
| 2,068,210 | Walker | Jan. 19, 1937 |
| 2,080,508 | Sackett | May 18, 1937 |

FOREIGN PATENTS

| Number | Country | Date |
| --- | --- | --- |
| 343,104 | Italy | Sept. 12, 1936 |
| 500,989 | Great Britain | Feb. 20, 1939 |